United States Patent [19]

Dombrowski

[11] 3,839,932

[45] Oct. 8, 1974

[54] WHEEL TURNING LATHE

[75] Inventor: Theodor Dombrowski, Erkelenz, Germany

[73] Assignee: Wilhelm Hegenscheidt Kommanditgesellschaft, Erkelenz, Germany

[22] Filed: Jan. 30, 1973

[21] Appl. No.: 328,124

[30] Foreign Application Priority Data
Jan. 23, 1973   Germany............................ 2204328

[52] U.S. Cl. .................................................. 82/8
[51] Int. Cl. ............................................ B23b 5/28
[58] Field of Search .......................................... 82/8

[56] References Cited
UNITED STATES PATENTS

| | | | |
|---|---|---|---|
| 3,256,754 | 6/1966 | Riviere et al. .......................... | 82/8 |
| 3,490,319 | 1/1970 | Feld ....................................... | 82/8 |
| 3,598,017 | 8/1971 | Smart..................................... | 82/8 X |

FOREIGN PATENTS OR APPLICATIONS

| | | | |
|---|---|---|---|
| 824,088 | 11/1959 | Great Britain ........................ | 82/8 |
| 1,218,157 | 12/1959 | France .................................. | 82/8 |

*Primary Examiner*—Harrison L. Hinson
*Attorney, Agent, or Firm*—Michael S. Striker

[57] ABSTRACT

A pit-mounted turning lathe for the wheels of wheel assemblies in railroad vehicles has a single driving roller for each of the two wheels of a wheel assembly and an adjustable cutting tool for each wheel. The driving rollers engage the respective wheels at one side and the tools engage the respective wheels at the other side of a vertical symmetry plane which includes the axis of the axle of a wheel assembly at the treating station above the pit. The wheel assembly is positioned and held by locating devices which engage the wheels and/or the journal boxes of the wheel assembly and act in three different directions. The driving rollers are pivotable with one-armed levers and rotate the wheels in a direction to produce forces having components acting downwardly in the vertical symmetry plane. The rails along which a wheel assembly travels toward and away from the treating station include rail sections which are pivotable about horizontal and vertical axes, and rail sections which are movable lengthwise. Prior to being engaged by the locating devices, a wheel assembly is centered by two pairs of projections which temporarily engage the wheels and serve to move the axis of the axle into a horizontal plane as well as to position the axis of the axle in the aforementioned symmetry plane so that the axis is normal to the longitudinal directions of the rails.

15 Claims, 16 Drawing Figures

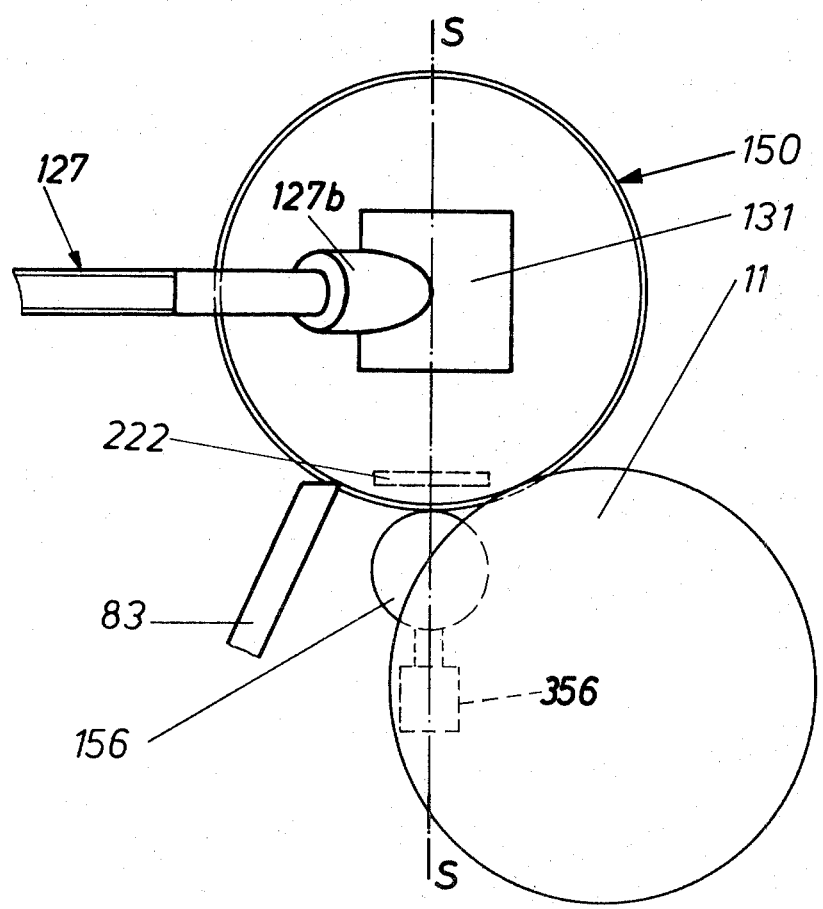
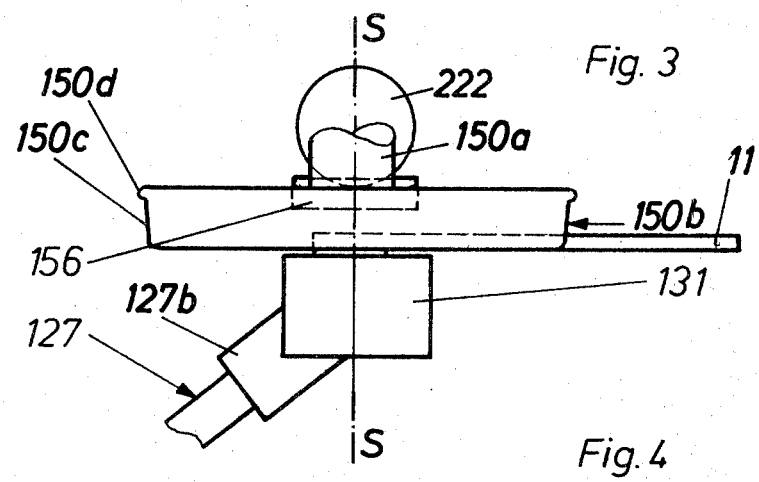
Fig. 3
Fig. 4

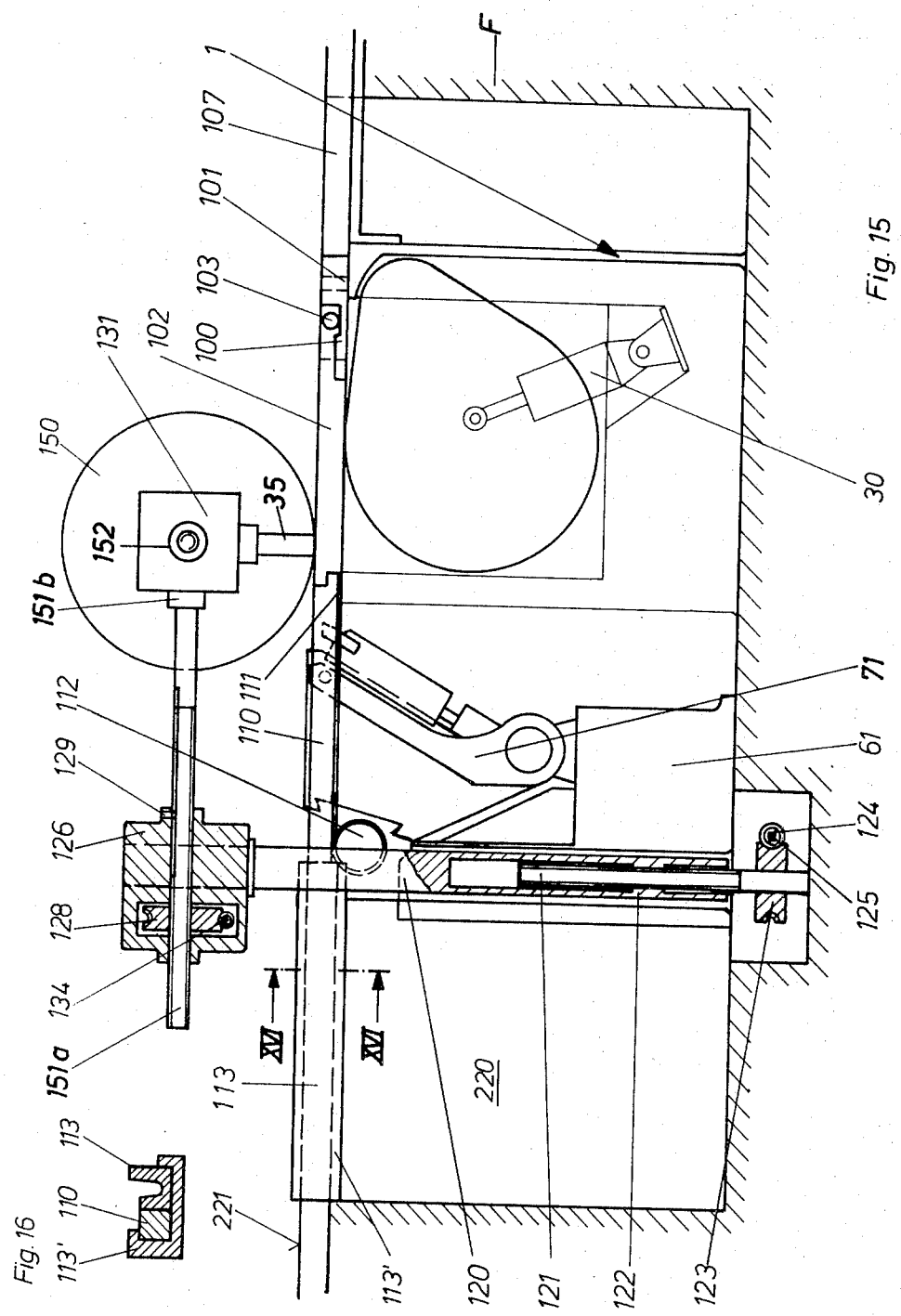

WHEEL TURNING LATHE

BACKGROUND OF THE INVENTION

The present invention relates to improvements in wheel turning lathes, and more particularly to improvements in pit-mounted lathes for treatment of multiple-wear wheels in wheel assemblies which form part of railroad vehicles. A wheel assembly normally comprises an axle with two journal boxes and two wheels located between the journal boxes. Each wheel normally comprises a rim which rolls along the rails of a railing track and two flanges which travel along the inner sides of the respective rails.

It is already known to treat the wheels of wheel assemblies for railroad vehicles in a lathe which is mounted in a pit below the wheel assembly and includes pairs of driving rollers which constitute the sole means for supporting the wheel assembly and are movalbe into frictional engagement with the wheels so that the rollers rotate the wheels while the peripheral surfaces of the wheels are treated by suitable turning tools. In presently known wheel turning lathes of the just outlined character, the pairs of driving rollers are mounted for movement up and down as well as for sidewise movement (in the axial direction of a wheel assembly). The driving rollers are moved up or down in order to move into or from engagement with the wheels. The lateral or sidewise movements of driving rollers are necessary in order to move such rollers into engagement with the flanges while the tools remove material from the rims, and vice versa.

Each pair of driving rollers is rigidly mounted in a housing mounted on a jack or an analogous lifting device so that the distance between the axes of driving rollers of each pair remains unchanged. Such mounting and manipulation of driving rollers are not entirely satisfactory, especially if the axis of the axle of a wheel assembly at the treating station above the pit is not exactly normal to the longitudinal directions of the rails. Also, such mounting of the driving rollers will not insure satisfactory positioning of a wheel assembly during truing of its wheels if the axis of the axle is not located in a horizontal plane. Still further, when the pairs of driving rollers engage and rotate the rims of the respective wheels, all four rollers cannot engage the respective wheels at the same time if the rim of one wheel is worn to such an extent that its outline deviates considerably from a circular outline. It is desirable that each wheel of a wheel assembly which undergoes treatment in the lathe should be engaged at all times by both driving rollers of the respective pair. Still further, the rollers of each pair of driving rollers cannot always engage the respective wheels if the flanges and/or the rims of such wheels include strongly deformed (dented or otherwise damaged) portions. Thus, if the driving rollers engage the flanges of the respective wheels and one of the flanges exhibits a pronounced depression or dent, at least one of the respective pair of driving rollers will be out of contact with the flange while it is being by-passed by the dent whereby the orientation of the entire wheel assembly changes so that the truing action of the material removing tools is far from satisfactory.

Another drawback of presently known wheel turning lathes wherein the wheels are supported and driven by pairs of driving rollers is that the shifting of driving rollers from engagement with the flanges into engagement with the rims of the adjacent wheels or vice versa consumes much time. Thus, when the removal of material from the rims is completed (the driving rollers then engage the flanges of the adjacent wheels), the wheel assembly must be temporarily propped by means other than the driving rollers, the driving rollers must be disengaged from the flanges, the driving rollers must be moved into register with the rims, the driving rollers must be moved into engagement with the adjacent rims, and the propping means must be retracted so that the wheels are ready to be rotated by the respective pairs of driving rollers which then engage the rims. As a rule, the driving rollers must be shifted laterally (in the axial direction of the wheel assembly) at least twice during treatment of a pair of wheels. Moreover, the aforementioned propping means must be located in the spaces between the respective pairs of driving rollers so as to insure that the wheel assembly is properly supported while the driving rollers are temporarily disengaged from its wheels. The placing of propping means between the pairs of driving rollers is particularly desirable when the wheels are out of round so that the treatment involves removal of material for the purpose of insuring that each of the wheels will have a peripheral surface of truly circular outline. The spaces between the pairs of driving rollers must further accommodate the supports for the material removing tools as well as portions or sections of the rails along which a wheel assembly travels toward and from the treating station and means for measuring the diameters of wheels during removal of material therefrom. Still further, such spaces must accommodate several elements of the control means or programming means for the lathe. In other words, the area immediately below the wheels of a wheel assembly which is located at the treating station above the pit is very crowded so that the parts which are mounted in such area interfere with the descent of chips or shavings which are being removed by the tools. The situation is further aggravated if the lathe is to treat wheel assemblies having wheels of relatively small diameter. As a rule, the driving rollers of each pair are located at the opposite sides of a vertical plane including the axis of the axle of a wheel assembly at the treating station; thus, when the pairs of driving wheels support and rotate wheels having relatively small diameters, each such wheel penetrates well into the space between the respective rollers to further reduce the area which is available for the mounting of aforementioned parts and for collection of chips. Moreover, the housings which support the pairs of driving rollers must be quite sturdy and therefore rather bulky so that, when the driving rollers support wheels having relatively small diameters, the housings are likely to abut against the adjacent portions of a railroad vehicle. Consequently, the wheel assembly including relatively small-diameter wheels must be removed from the vehicle with attendant losses in time. It was found that, if a lathe of the just outlined character is to remove large quantities of material within a reasonably short interval of time, it is likely to be choked due to removal of material at a rate which exceeds the capacity of the pit.

It was further found that the method of supporting the wheel assembly exclusively by driving rollers which engage the flanges or rims of the respective wheels is not entirely satisfactory, especially if the flanges and/or rims are damaged at several points so that the axis of the axle moves in many directions when the wheels rotate in response to rotation of the driving rollers. In such instances, the supporting and centering action of the driving rollers must be assisted by additional parts which contribute to crowding of the area in the region of driving rollers and reduce the space which is available for reception of chips.

It is further known to provide a pit-mounted wheel turning lathe with discrete driving and supporting or propping means. The driving means includes a pair of rollers for each wheel of a wheel assembly, and the propping means includes devices which engage the bearings for the wheels. The propping devices engage the bearings from below and the driving rollers of each pair are located at the opposite sides of a vertical plane which includes the axis of the wheel axle. Such lathes also exhibit a number of serious drawbacks, especially as concerns the crowding of the area immediately below the wheels and the depth of cuts which can be performed by the tools since the major part of the weight of the wheel assembly is taken up by the propping devices so that the driving rollers must be urged into strong frictional engagement with the wheels in order to rotate the wheels while the tools remove relatively thick shavings. The force which the driving rollers exert upon the wheels cannot be increased at will because the rollers are likely to lift the wheel assembly off the propping devices.

SUMMARY OF THE INVENTION

An object of the invention is to provide a wheel turning lathe, particularly a pit-mounted lathe for treating multiple-wear wheels of wheel assemblies forming part of railroad vehicles and having a pair of wheels mounted on an axle between a pair of journal boxes, wherein the component parts of the lathe are distributed in such a way that they do not interfere with gravitational descent and/or accumulation of shavings and-/or chips below the treating station.

Another object of the invention is to provide a wheel turning lathe wherein the driving rollers for the wheels of a wheel assembly need not be shifted in the axial direction of the wheels so that the treatment of each wheel can be completed in a continuous operation.

A further object of the invention is to provide a wheel turning lathe which can be used for treatment of largediameter or small-diamter wheels without necessitating a separation of wheel assemblies from the trucks or frames of the respective railroad vehicles.

An additional object of the invention is to provide a wheel turning lathe wherein a single driving member suffices to rotate a wheel of a wheel assembly and wherein a wheel assembly can be centered in a timesaving operation.

Still another object of the invention is to provide the wheel turning lathe with novel and improved means for centering a wheel assembly in an optimum position for engagement of its wheels by the driving and material removing means.

A further object of the invention is to provide a wheel turning lathe which can complete the treatment of wheels on a wheel assembly within a small fraction of the time which is required for such operation in a conventional lathe.

Another object of the invention is to provide a wheel turning lathe with novel and improved means for guiding a wheel assembly toward and away from the treating station and with novel means for supporting and moving the driving rollers, the material removing tools, the locating means for the wheel assembly and the guide means for the wheels.

The invention is embodied in a wheel turning lathe, particularly in a pit-mounted lather for treating multiple-wear wheels of wheel assemblies forming part of railroad vehicles and having axles carrying pairs of journal boxes and pairs of wheels located between the journal boxes. The lathe comprises locating means which are actuatable to engage a wheel assembly so as to maintain the axis of the axle of the thus located or positioned wheel assembly in a predetermined vertical plane (the locating means may include devices which engage the wheels and/or the journal boxes), a single pair of driving rollers each movable into driving engagement with one wheel of a properly positioned wheel assembly, and material removing tools which are movable against the wheels of a properly positioned assembly to remove material from the flanges and/or rims of wheels, preferably in synchronism with movements of a follower which tracks a suitable pattern.

In accordance with a feature of the invention, the driving rollers engage the respective wheels at one side of a vertical symmetry plane which includes the axis of the axle of a properly positioned assembly, and the tools engage the respective wheels at the other side of such symmetry plane. This provides ample room for the descent of chips or shavings in the space between the driving rollers and the tools. The locating means preferably includes two identical sets of locating devices each of which can engage a wheel assembly in the region of one of the wheels so that a properly positioned assembly is held against movement in the axial direction of its axle as well as in two directions which the normal to the axial direction of the axle and are preferably normal to each other.

The novel features which are considered as characteristic of the invention are set forth in particular in the appended claims. The improved wheel turning lathe itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 illustrates the structure of FIG. 1 but with different locating means for the wheel assembly;

FIG. 4 is a plan view of the structure shown in FIG. 3;

FIG. 15 is a longitudinal vertical sectional view of the entire pit-mounted turning lathe; and FIG. 16 is a vertical sectional view as seen in the direction of arrows from the line XVI—XVI of FIG. 15.

DESCRIPTION OF THE PREFERRED EMBODIMENTS

Figures 1, 2:
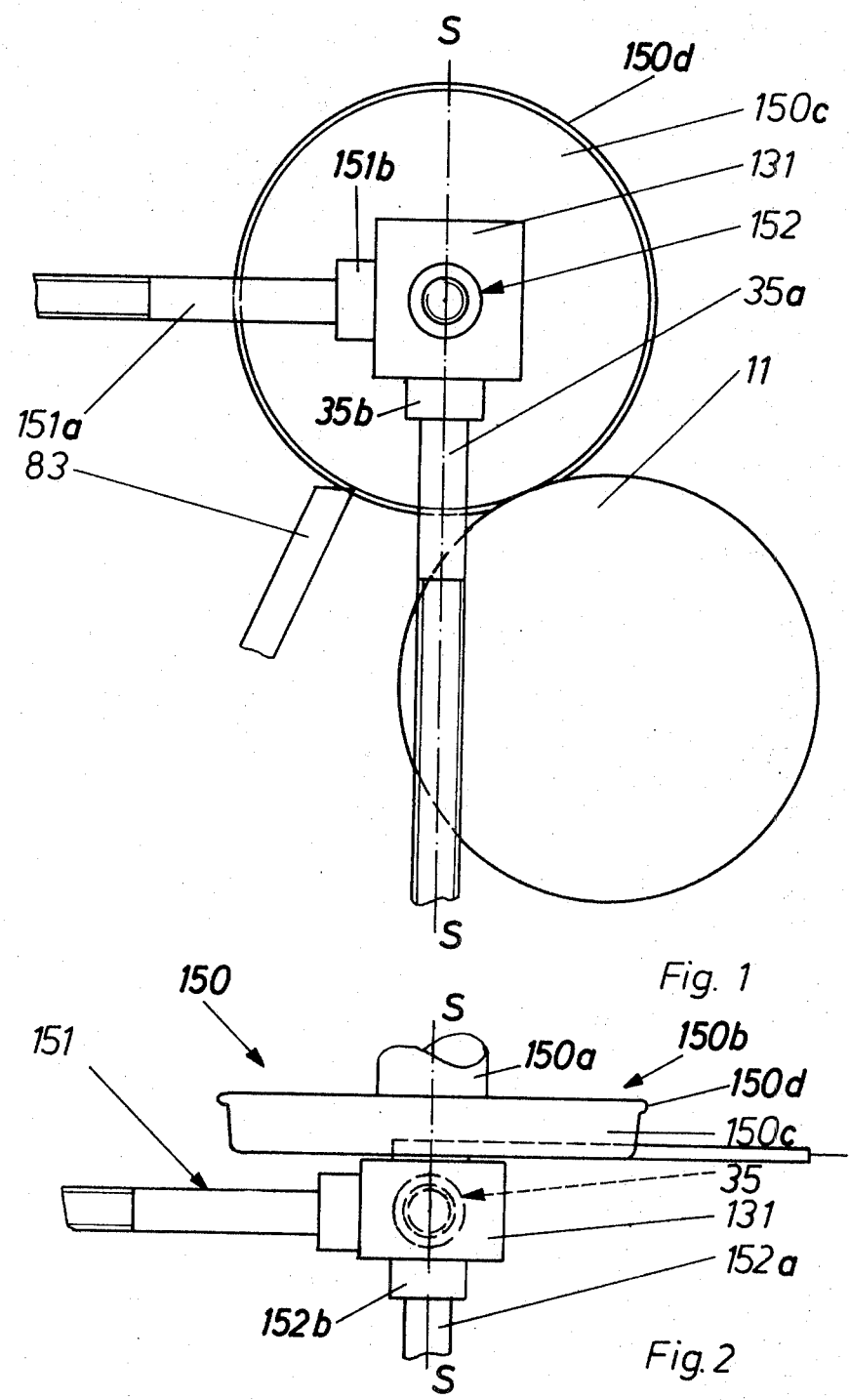
FIG. 1 is an end elevational view of a wheel assembly and further showing one of the driving rollers and one of the turning tools as well as one embodiment of locating means for the wheel assembly.
FIG. 2 is a plan view of the structure shown in FIG. 1.

Referring first to FIG. 15, the wheel turning lathe is mounted in a pit 220 at a level below the top planes 221 of two sets of rails along which the wheel assemblies 150 are advanced to and from a truing or treating station above the pit. The lathe comprises two mirror symmetrical halves or sections including a right-hand section or half which is illustrated in the drawing and a mirror symmetrical left-hand section or half which is not shown. A wheel assembly 150 whose wheels are to be treated by the tools of the improved lathe comprises an axle 150a (see FIGS. 1-2), two journal boxes 131 and two wheels 150b located between the journal boxes and each having a rim 150c which rolls on top of the respective rail and a flange 150d which travels along the inner side of the respective rail. The wheel assembly 150 is assumed to be installed in a railroad vehicle (not shown) during treatment by the lathe which embodies the invention.

A first mode of positioning or locating the wheel assembly 150 at the treating station is shown in FIGS. 1 and 2. The locating or positioning means comprises three discrete locating devices 35, 151 and 152 for each of the two journal boxes 131. As shown, each locating device comprises a feed screw (35a, 151a, 152a) for a jaw (35b, 151b, 152b) which engages the respective journal box 131 to thus position and hold the wheel assembly 150. The wheels 150b can be rotated by driving rollers 11, one for each wheel 150b, and the peripheral surfaces of the wheels 150b can be treated by turning tools 83. Each driving roller 11 engages the rim 150c of the respective wheel 150b. The line S—S denotes in FIGS. 1 and 2 a vertical symmetry plane which includes the axis of the axle 150a of a properly positioned wheel assembly 150 and further includes the axes of the locating devices 35, 152. The axis of the locating device 151 is shown as being normal to the symmetry plane S—S. It will be noted that the driving roller 11 engages the wheel 150b at one side and the tip of the tool 83 engages the wheel 150b at the opposite side of the symmetry plane S—S. The locating device 35 supports the respective journal box 131 from below, the locating device 152 is coaxial with the axle 150a, and the axis of the locating device 151 is normal to the axes of the locating devices 35 and 152. Since the wheel 150b simultaneously abuts against the driving roller 11, the wheel assembly 150 is held against any stray movements during treatment of its wheel 150b by the tool 83. The feed screws 35a, 151a, 152a of the locating devices can move axially in response to rotation of spindle nuts to thereby move the respective jaws (35b, 151b, 152b) toward or away from the journal box 131 at the treating station. The locating devices 35, 151, 152 will be used in the improved wheel turning lathe when the railroad vehicle comprises wheel assemblies 150 wherein the wheels 150b have limited freedom or no freedom of axial movement relative to the respective axles 150a. The turning lathe the details of which are shown in FIGS. 5 through 16 is assumed to embody the locating devices 35, 151 and 152 of FIGS. 1 and 2.

FIGS. 3 and 4 illustrate a different positioning or locating mechanism for the wheel assemblies 150 of railroad vehicles. The illustrating locating mechanism includes a supporting roller 156 for each of the wheels 150b and a locating device 127 which is somehow similar to the locating device 35, 151 or 152 but engages the respective journal box 131 at a different angle, namely, so that its axis makes an acute angle (of preferably 45°) with the axis of the axle 150a and is located in a horizontal plane. The jaw 127b of the locating device 127 urges the respective wheel 150b against the adjacent driving roller 11. At the same time, the inner side of the wheel 150b is urged by the jaw 127b against a stop here shown as an arresting roller 222. Again, the line S—S denotes a vertical symmetry plane which includes the axis of the axle 150a of a properly positioned wheel assembly 150 and the axis of the supporting roller 156. The latter engages the flange 150d of the wheel 150b. The driving roller 11 engages the rim 150c of the wheel 150b at one side and the tool 83 engages the wheel 150b at the other side of the symmetry plane S—S. The locating mechanism of FIGS. 3 and 4 is employed when the wheels 150b have substanital freedom of axial movement relative to the respective axle 150a and cannot be centered in axial bearings.

The means for moving the supporting roller 156 up and down is shown schematically at 356. Such means may include a suitable hydraulic jack.

Locating means including the device 127 and supporting roller 156 is used in wheel turning lathes wherein the space below the journal box 131 is occupied so that there is no room for the locating device 35 of FIGS. 1 and 2. Also, the locating device 127 can be used as a space-saving substitute for the locating devices 151, 152 of FIGS. 1 and 2.

The supporting rollers 156 need not be driven and engage the flanges 150d which are much less likely to be deformed than the rims 150c so that, once the rollers 156 engage the adjacent wheels of a wheel assembly 150, the axis of the axle 150a remains in a horizontal plane during the entire period of removal of material by the tools 83.

When the lathe is in use, the driving rollers 11 are urged against the respective rims 150c by hydraulic systems including accumulators which are effective until the truing of peripheral surfaces of the rims 150c is completed. The accumulators are thereupon short-circuited. The resulting axial shocks are taken up by the rollers 222 of FIGS. 3-4 which are used with the locating devices 127 if the wheels 150b have freedom of axial movement relative to the axles 150a.

Figure 5:
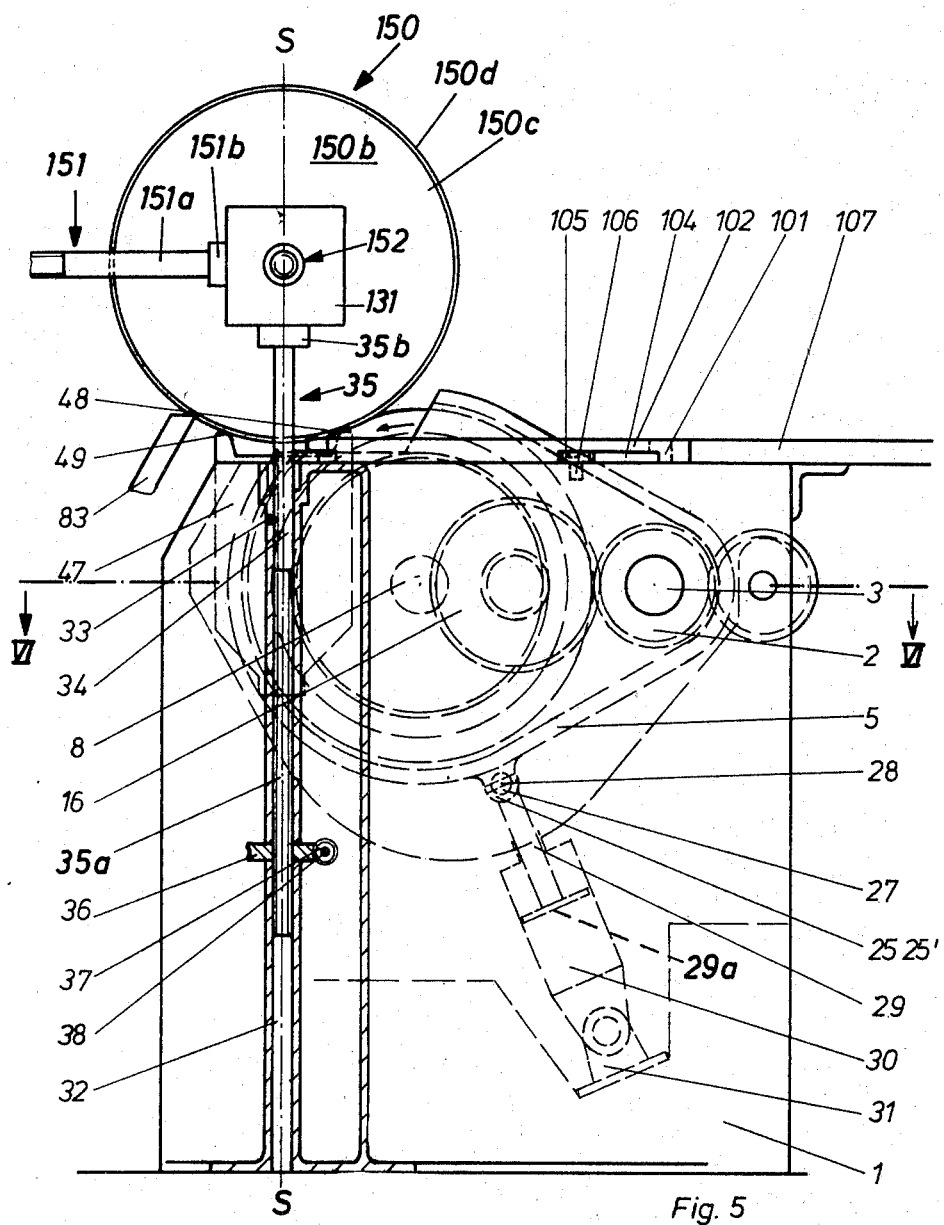
FIG. 5 illustrates the structure of FIG. 1 and certain other components of a wheel turning lathe, partly in a longitudinal vertical sectional view.
Figure 6:
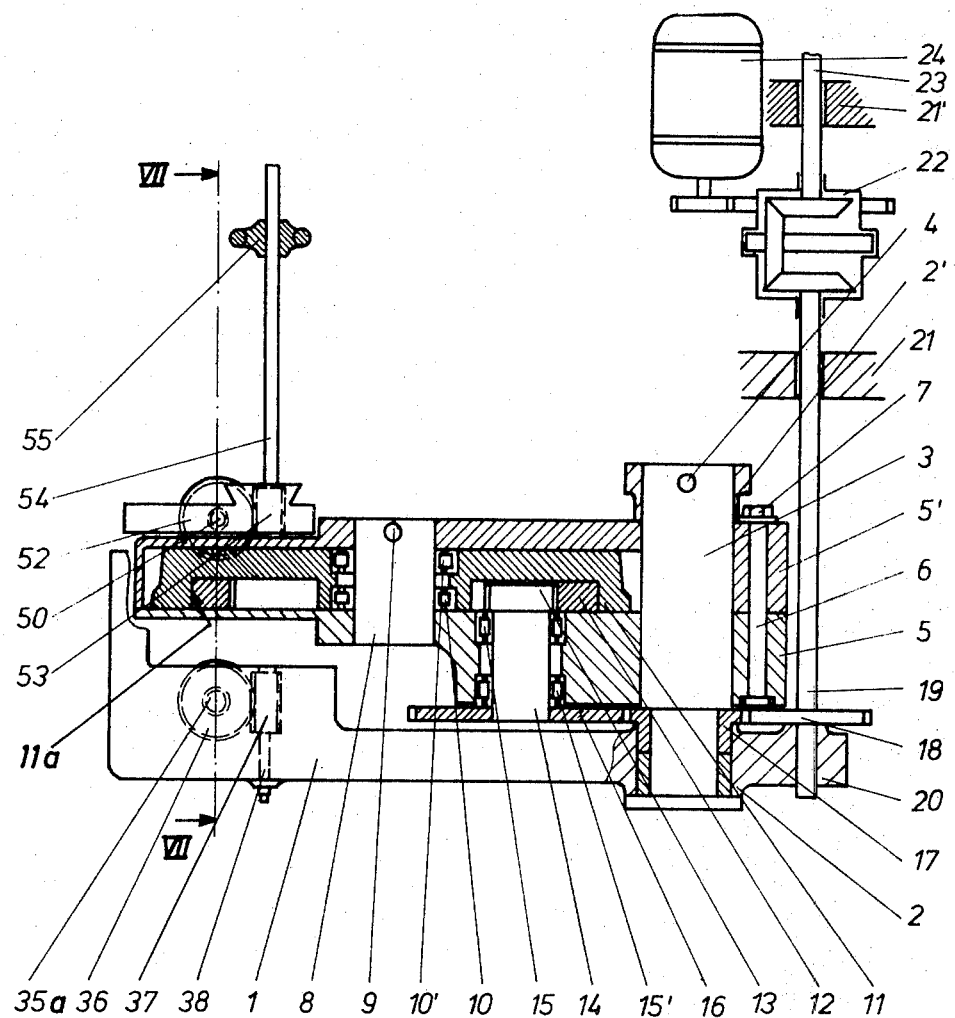
FIG. 6 is a horizontal sectional view as seen in the direction of arrows from the line VI—VI of FIG. 5.
Figure 7:
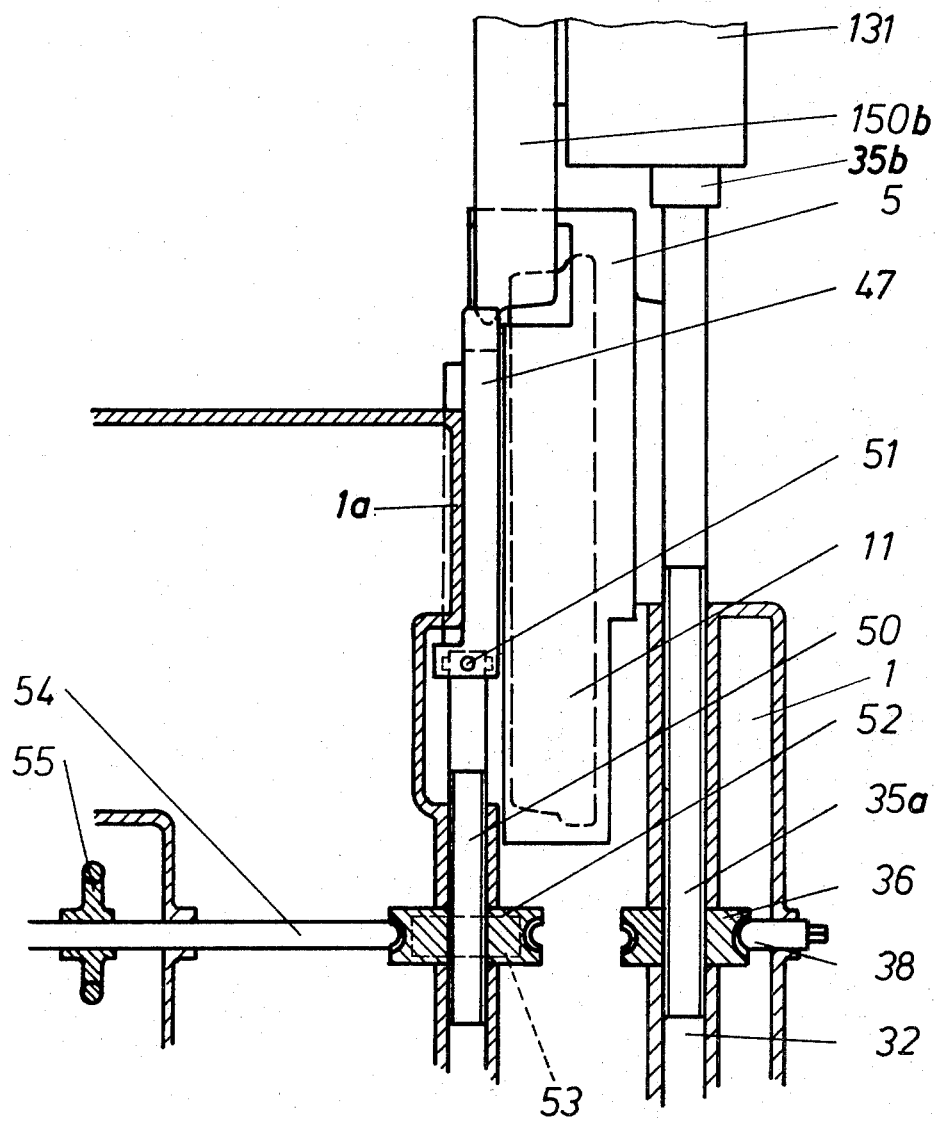
FIG. 7 is a vertical sectional view as seen in the direction of arrows from the line VII—VII of FIG. 6.

The pit 220 of FIG. 15 is defined by a concrete foundation F which supports a frame 1 best shown in FIGS. 5, 6 and 7. The frame 1 carries two coaxial bearing members 2, 2' for a horizontal pivot 3 which is held against rotation in the bearing members 2, 2' by radially extending pins 4 (see FIG. 6). The median portion of the pivot 3 supports two sections 5, 5' of a housing which can turn about the axis of the pivot 3 and whose sections are separably secured to each other by bolts and nuts 6, 7 or analogous fastener means. The housing including the sections 5, 5' supports a horizontal shaft 8 which is non-rotatably secured thereto by one or more pins 9. The median portion of the shaft 8 is surrounded by antifriction bearings 10, 10' for the driving roller 11. It will be noted that the housing 5, 5' for the driving roller 11 resembles a one-armed lever which is fulcrumed at 3 and can move the roller 11 up or down, i.e., toward and away from a wheel 150b. One end face of the driving roller 11 has a recess 11a for an internal gear 12 which is fixedly secured thereto and meshes with a spur gear 13. The shaft 14 of the spur gear 13 is mounted in the housing 5, 5' and rotates in antifriction bearings 15, 15'. The shaft 14 is rigid with a further spur gear 16 which meshes with a spur gear 17. The latter is rotatably mounted on the pivot 3 for the housing 5, 5' and meshes with a spur gear 18 secured to an elongated shaft 19 which is journalled in bearings 20, 21 of the frame 1 and receives torque from one bevel gear of a differential 22. A second shaft 23 which is coaxial with the shaft 19 is driven by another bevel gear of the differential 22 which, in turn, is driven by the output shaft of an electric motor 24 constituting the main prime mover of the lathe. The shaft 23 serves to transmit torque to the driving roller 11 in the non-illustrated left-hand half of the lathe. The differential 22 insures that both driving rollers 11 can transmit identical torques. The shaft 23 is rotatable in two bearings (one shown at 21') of the frame 1.

It will be noted that the housing 5, 5' not only constitutes a pivotable lever for the driving roller 11 but also serves as a case for the gear train which connects the driving roller 11 with the shaft 19. The mounting of the gear 17 on the pivot 3 insures that the gear 18 can drive the roller 11 even if the housing 5, 5' turns about the axis of the pivot 3.

The means for pivoting the housing 5, 5' with the driving roller 11 comprises a horizontal pin 27 mounted in bearings 25, 25' of the housing 5, 5' and held against axial movement by one or more studs 28. The pin 27 is articulately connected with the upper end portion of an elongated piston rod 29 secured to a piston 29a in a double-acting hydraulic cylinder 30. The lower end portion of the cylinder 30 is pivotably secured to a bracket 31 which is mounted in the frame 1. The driving roller 11 is urged against the rim 150c of the wheel 150b at the treating station when the lower chamber of the cylinder 30 receives a pressurized fluid (e.g., oil).

The aforementioned locating device 35 comprises the feed screw 35a which is guided in an upright sleeve 32 of the frame 1. The sleeve 32 meshes with a radially extending screw 33 (see FIG. 5) whose tip extends into an axially parallel external groove 34 of the feed screw 35a so that the latter cannot rotate in but is movable axially of the sleeve 32. The feed screw 35a meshes with a spindle nut 36 whose outer portion constitutes a worm wheel meshing with a horizontal worm 37 provided on a worm shaft 38. The spindle nut 36 cannot move axially but is rotatable relative to the sleeve 32 so that, when the shaft 38 rotates, the feed screw 35a moves its jaw 35b up or down, depending on the direction of rotation of a hand wheel (not shown) secured to the polygonal outer end portion of the shaft 38. As mentioned above, the locating device 35 serves to support from below that journal box 131 of a wheel assembly 150 which is adjacent to the illustrated driving roller 11.

The frame 1 further comprises vertical guide means or ways 1a (FIG. 7) for a slide 47 which is provided with two centering projections 48, 49 serving to engage the flange 150d of a wheel 150b (see FIG. 5). The centering projections 48, 49 engage the flange 150d at the opposite sides of the symmetry plane S—S and are located between the tool 83 and driving roller 11. The projections 48, 49 are located directly below the wheel assembly 150 regardless of the diameters of wheels 150b of such assembly.

The lower end portion of the slide 47 is connected to a feed screw 50 by a pin 51 so that the feed screw 50 cannot rotate in the frame 1. This feed screw meshes with a spindle nut 52 the outer portion of which consitutes a worm wheel in mesh with a horizontal worm 53 on a shaft 54 which is rotatable in the frame 1. The exposed portion of the worm shaft 54 is of polygonal outline and is connected with a hand wheel 55 which can be rotated to move the slide 47 with the centering projections 48, 49 up or down. The worm shaft 54 further carries a second worm (not shown) which can move up or down a second slide (not shown) in the left-hand half of the lathe. Thus, when the hand wheel 55 is rotated, the projections 48, 49 on the slide 47 move in synchronism with the projections which serve to center the other wheel 150b of a wheel assembly 150 above the pit 220.

As a rule, a wheel assembly 150 which has been advanced above the pit 220 requires at least some reorientation, for example, to place the axis of its axle 150a into a horizontal plane and/or to move the axis of the axle 150a to a position at exactly 90° to the longitudinal directions of the rails. The placing of the axis of the axle 150a into a horizontal plane is completed as soon as one wheel 150b of the wheel assembly 150 abuts against the projections 48, 49 of the slide 47 and the corresponding projections of the other slide (not shown) engage the other wheel of the same wheel assembly. This will be readily understood since the top faces of all four centering porjections are assumed to be located in a common horizontal plane. The projections 48, 49 engage the flanges 150d of the respective wheels 150b, i.e., those portions of the wheels whose peripheral surfaces are not subjected to appreciable wear.

The other alignment of the axis of the axle 150a (so that this axis is normal to the longitudinal direction of the rails) is also completed in automatic response to engagement of each wheel flange 150d with the respective centering projections. This will be understood by bearing in mind that the projections 48, 49 on the illustrated slide 47 are in exact transverse alignment with the projections of the slide in the other half of the lathe. Thus, as soon as each of the two wheel flanges 150d is engaged by the respective projections 48, 49, the axis of the axle 150a is located in a horizontal plane and is also normal to the longitudinal directions of the rails. The weight of the wheel assembly 150 is sufficient to maintain the wheel flanges 150d in abutment with the respective centering projections 48, 49. Thus, the movement of the axis of the axle 150a to a position exactly at right angles to the longitudinal direction of the rails for the railroad vehicle takes place in automatic respond to movement of the axis of such axle into a horizontal plane.

Figure 8:
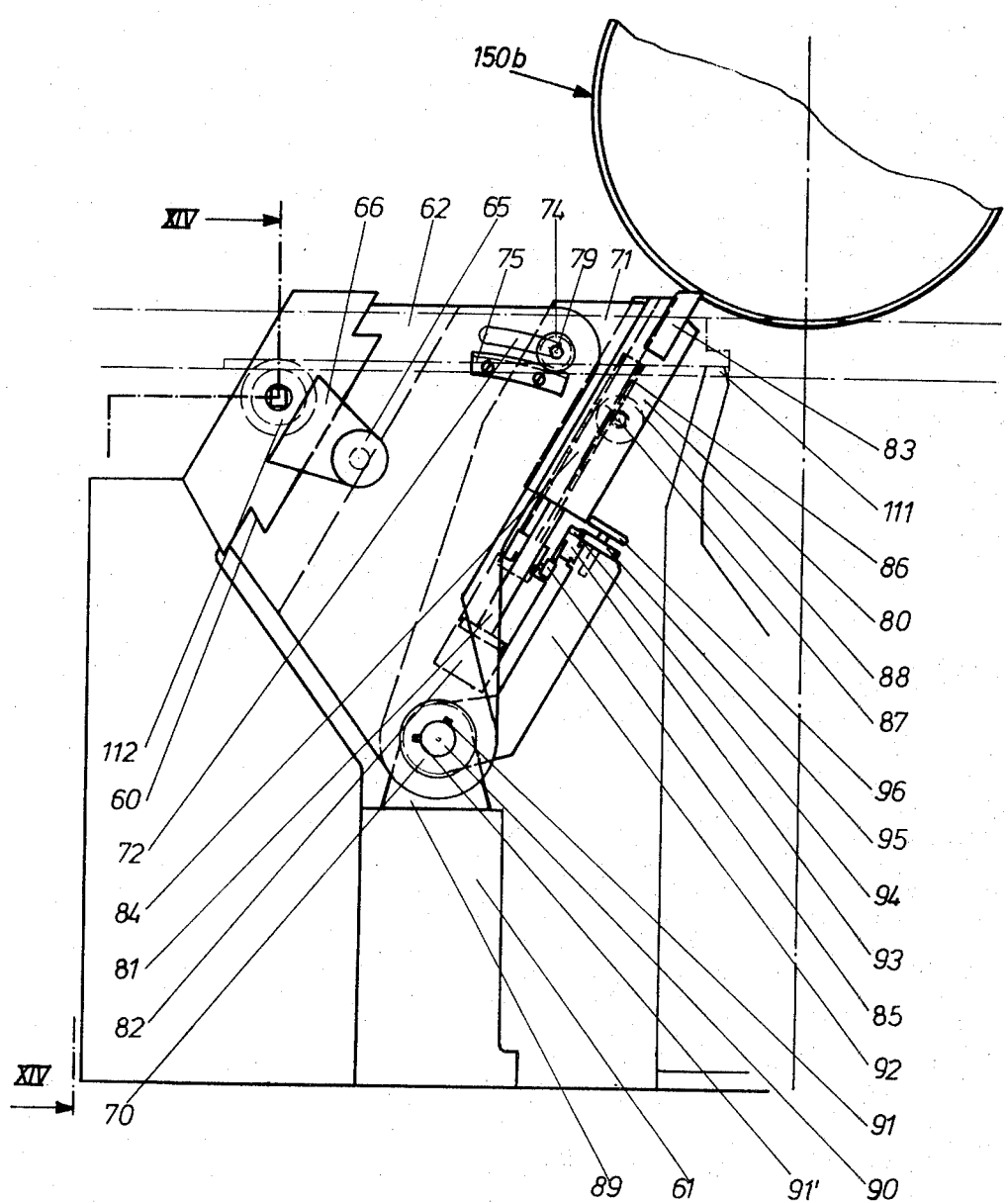
FIG. 8 is a side elevational view of that portion of the wheel turning lathe which is located to the left of the structure shown in FIG. 5.
Figure 9:
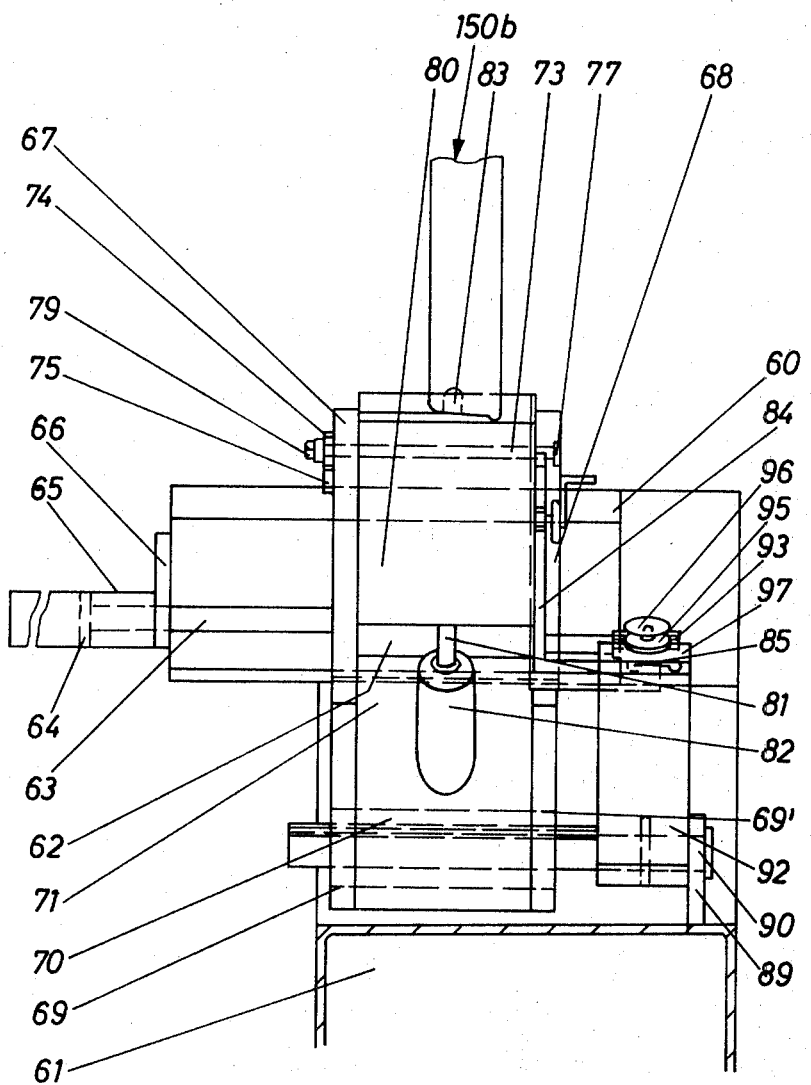
FIG. 9 is an end elevational view of the structure shown in FIG. 8.
Figure 10:
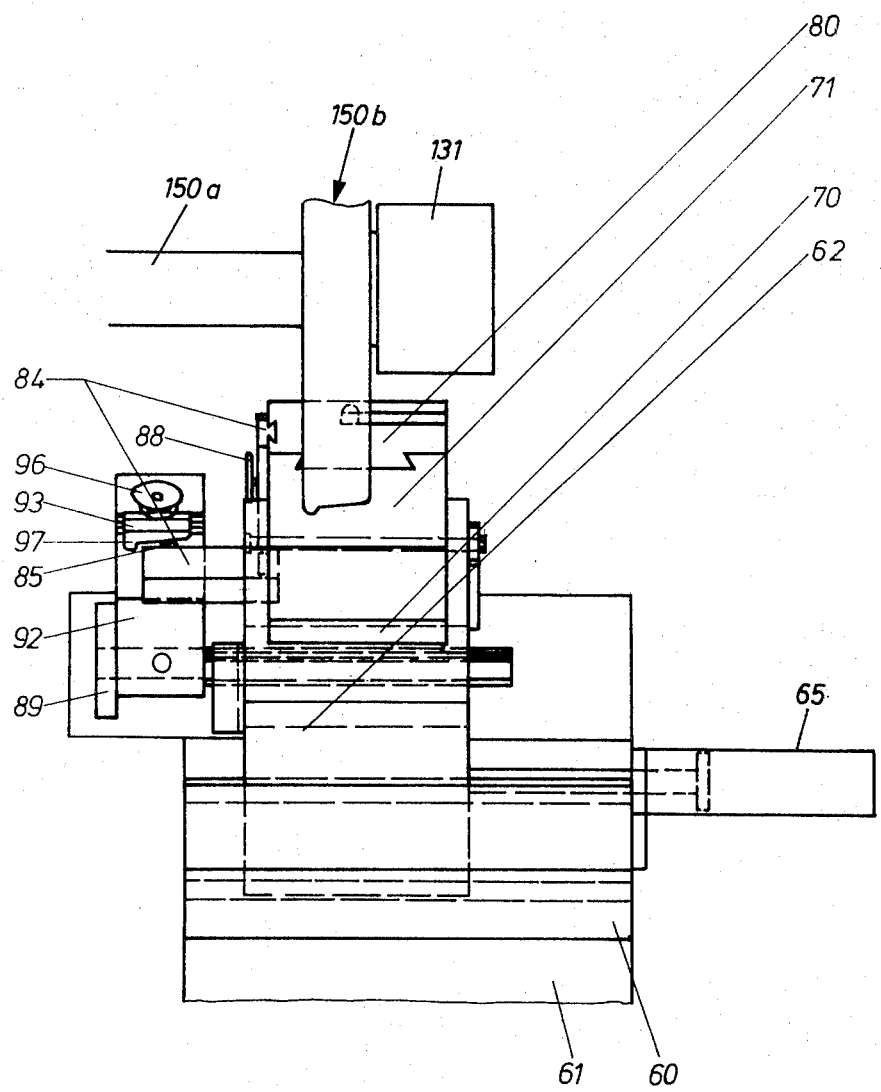
FIG. 10 is a plan view of the structure shown in FIGS. 8 or 9.
Figure 13:
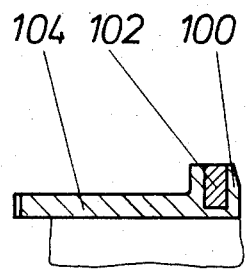
FIG. 13 is a sectional view as seen in the direction of arrows from the line XIII—XIII of FIG. 12.
Figure 12:
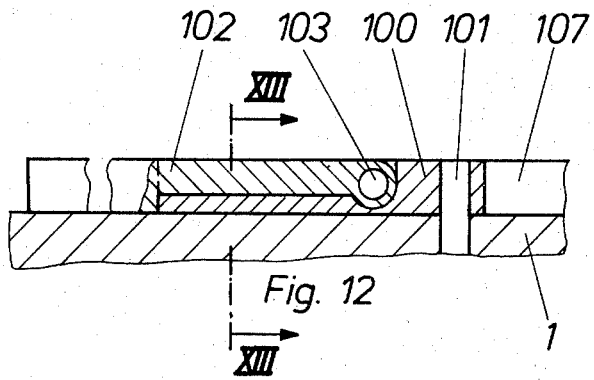
FIG. 12 is a sectional view as seen in the direction of arrows from the line XII—XII of FIG. 11.
Figure 11:
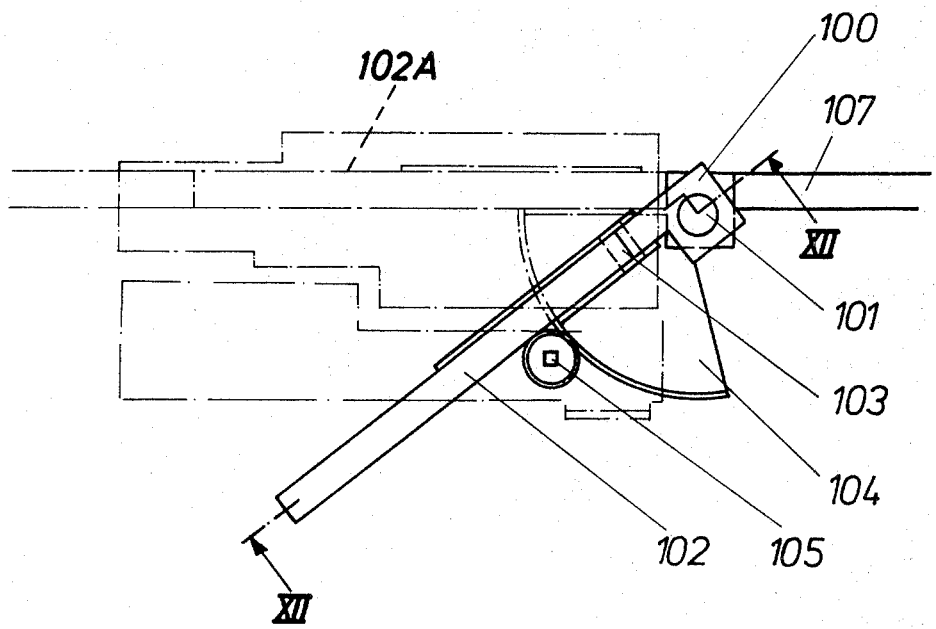
FIG. 11 is plan view of one of a set of guide rails along which a wheel assembly moves into the range of and away from the material removing tools.

The structure for movably and adjustably supporting and feeding the tool 83 is shown in FIGS. 8, 9 and 10. This structure includes a frame member 61 which carries horizontal ways 60 for a carriage 62. The ways 60 extend transversely of the rails for the wheel assembly 150. The carriage 62 is threadedly connected with a horizontal piston rod 63 which is rigid with a piston 64 in a double-acting hydraulic cylinder 65. The latter is mounted on a bracket 66 which is secured to the ways 60 by screws or analogous fasteners. The carriage 62 has two walls or cheeks 67 and 68 which are respectively provided with registering bores 69, 69'.

The bores 69, 69' receive the end portions of a horizontal pivot 70 for a lever 71 which is provided with ways for a cross slide 80. The upper portion of the cheek 67 has a slot 72 for an externally threaded bolt 73 which is slidable therein and is also slidable in a registering slot of the cheek 68. The bolt 73 extends through and is movable with the lever 71. That end portion of the bolt 73 which is adjacent to the slot 72 is connected with a gear 74 having a hub with several radially extending bores (not shown) for reception of a key (not shown) by means of which an operator can change the angular position of the gear 74. The latter meshes with a gear segment 75 on the cheek 67.

A lock nut 79 at the outer end of the bolt 73 is normally in strong frictional engagement with the gear 74 so that the latter is urged against the outer side of the cheek 67. At the same time, the head 77 of the bolt 73 is urged against the adjacent surface of the cheek 68 to hold the lever 71 in a selected angular position in which the lever assumes a desired orientation relative to the wheel 150b. In order to change the angular position of the lever 71, the operator loosens the lock nut 79 and rotates the gear 74 by means of the aforementioned key so that the gear 74 rolls along the segment 75 and changes the angular position of the lever. A washer or the like is preferably interposed between the lock nut 79 and the gear 74. The adjustment of the lever 71 is preferably such that the cross slide 80 thereon can be fed exactly radially of the wheel 150b.

The lower end portion of the cross slide 80 is connected with a piston rod 81 which is further connected with a piston in a double-acting hydraulic cylinder 82. The latter is secured to the lever 71. The cross slide 80 carries the tool 83 and is provided with horizontal ways fro a further slide (hereinafter called auxiliary slide) 84 supporting a hydraulic feeler or scanning device 85. The auxiliary slide 84 is connected with a toothed rack 86 meshing with a pinion 87 which is rotatably mounted in the cross slide 80 but is held against axial movement therein. The auxiliary slide 84 can be shifted in response to rotation of a hand wheel 88 for the pinion 87.

The frame member 61 supports a bearing 89 for a shaft 90 which is rotatable but is held against axial movement. One end portion of the shaft 90 extends into a bore of the pivot 70 for the lever 71 and the members 70, 90 are coupled to each other by keys 91, 91'. The shaft 90 supports a lever 92 for a carriage 93 which supports a pattern 97. The carriage 93 is movable in the longitudinal direction of the lever 92 and is connected with a toothed rack 94 meshing with a pinion 95. The latter is rotatable in but cannot move axially relative to the lever 92. The means for rotating the pinion 95 comprises a hand wheel 96. The outline of the pattern 97 is tracked by the feeler 85.

The mounting of a supporting rail section 102 for the wheel 150b is shown in FIGS. 5, 11, 12 and 13. A holder 100 is pivotable on a vertical pin 101 which is mounted in the frame 1. The holder 100 has a recess for the rail section 102 and is connected thereto by a horizontal pivot pin 103. A gear segment 104 which is fixed to the holder 100 meshes with a gear 105 which is rotatable in the frame 1 on a shaft 106. The gear 105 has a polygonal recess for reception of a tool (not shown) by means of which the segment 104 can be pivoted with the holder 100 and rail section 102. The rail section 102 assumes the solid-line position of FIG. 11 during removal of material from a wheel 150b. When the wheel 150b is to be moved to or from the treating station, the rail section 102 assumes the phantom-line position 102A of FIG. 11.

Figure 14:
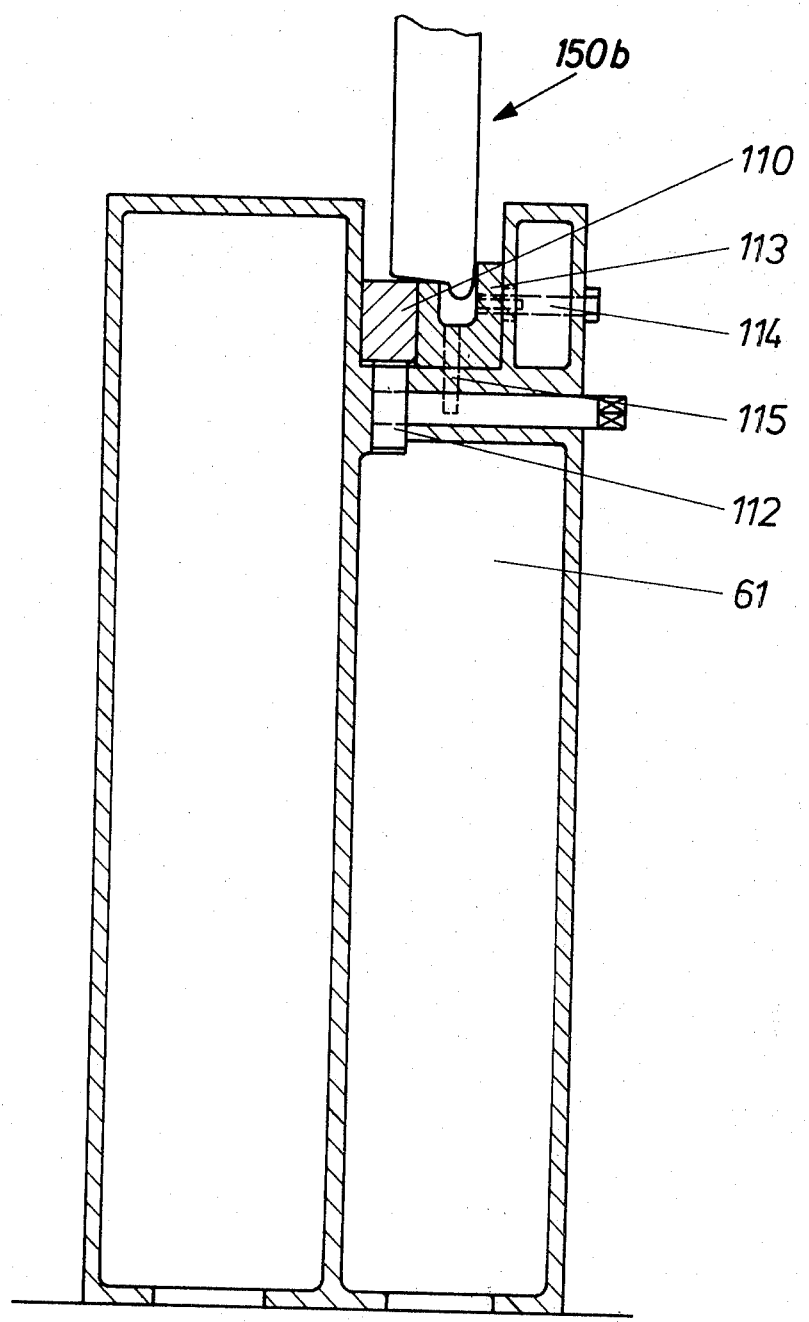
FIG. 14 is a vertical sectional view as seen in the direction of arrows from the line XIV—XIV of FIG. 8.

When it assumes the position 102A, the rail section 107 one end of which is fixed to the frame 1 and the other end of which is firmly embedded in the floor of the workshop. The rail sections 102, 107 are located at one side of the treating station. A further rail section 110 at the other side of the treating station (see FIGS. 14 and 15) rests at one end on a support 111 of the frame 1. The other end of the rail section 110 extends into a slot of the frame member 61. The underside of the rail section 110 is provided with a toothed rack meshing with a pinion 112 which is rotatable in the frame member 61 and has a polygonal portion engageable by a wrench to change the axial position of the rail section 110. The rail section 110 then slides along a base member 113 which is secured to the frame member 61 by means of a screw 114 and a pin 115. The base member 113 further rests on a beam 113'. FIGS. 5, 14 and 15 show the rail sections 102, 107, 110 in positions they assume when a wheel 150b is free to roll to or from the treating station. The carriage 62 is then located out of the path of the oncoming wheel 150b so that the wheel assembly 150 can be rolled to the treating station and that the rail section 110 can assume the position shown in FIG. 15. The cross slide 80 dwells in its lower end position so that the tool 83 is retracted (downwardly). The rail section 110 rests on the frame member 61 and on the frame 1. The rail section 102 rests on the adjacent end portion of the rail section 110 and on the holder 100.

The frame 1 has a vertical bore or channel for a column 120 (FIG. 15) which is movable up and down and has a spindle nut 122 meshing with a feed screw 121 which is rotatable in the frame 1. The feed screw 121 is held against axial movement and extends into an axial blind bore of the column 120. The means for rotating the feed screw 121 (to thereby move the column 120 up or down) comprises a worm wheel 123 which is rigid with the feed screw 121 and can be rotated by a worm 124. As shown in FIG. 15, the parts 123, 124 are mounted in a gear case located in the bottom portion of the pit 220. The shaft 125 for the worm 124 can be driven by a motor (not shown) and this shaft carries a further worm (not shown) which can move the column in the left-hand half of the lathe so that the two columns move as a unit. Instead of using a motor, the shaft 125 can be rotated by a suitable key which is insertable into a polygonal hole at one or the other end of the shaft 125.

The upper end portion of the column 120 supports a rotatable casing 126 which is held against axial movement relative to the column. The casing 126 supports the feed screw 151a for the jaw 151b. The feed screw 151a is in mesh with a spindle nut 128 which is rotatably mounted in the casing 126 and the outer portion of which constitutes a worm wheel meshing with a worm 134. A pin 129 holds the feed screw 151a against angular movement in the casing 126; thus, when the worm 134 rotates, the jaw 151b moves toward or away from the journal box 131 at the treating station. The jaw 151b can be moved into engagement with the adjacent vertical external surface of the journal box 131.

A similar supporting arrangement is provided for the feed screw 152a of the locating device 152 which engages another external surface of the journal box 131 at tht treating station in a manner as described in connection with FIGS. 1 and 2. When it properly engages the journal box 131, the axis of the locating device 152 coincides with the axis of the axle 150a.

The operation of the wheel turning lathe is as follows:

When the movable rail sections 102, 110 and 113 assume the positions shown in FIGS. 14 and 15, the wheel assembly 150 of a railroad vehicle can be rolled to the treating station above the pit 220. The wheel assembly 150 is brought to a halt when the axis of its axle 150a is located in or close to the symmetry plane S—S shown in FIGS. 1, 2 and 5. The control system of the lathe then actuates a valve (not shown) which admits pressurized hydraulic fluid into the lower chamber of the cylinder 30 so that the driving roller 11 turns with the housing 5, 5' about the axis of the pivot 3 to engage the rail section 102 from below and to pivot this rail section about the axis of the horizontal pin 103 so that the wheel 150b on the rail section 102 is lifted through a distance of about 5 millimeters.

In the next step, the operator rotates the hand wheel 55 (see FIGS. 6 and 7) so that the centering projections 48, 49 of the slide 47 engage the flange 150d of the wheel 150b. As explained before, such engagement of the wheel 150b by the projections 48, 49 (simultaneously with engagement of the other wheel 150b by the projections in the other half of the lathe) results in automatic orientation of the axis of the axle 150a in such a way that the axis is normal to the rail sections 102, 107, 110, 113 and is located in a horizontal plane.

The worm shaft 38 is thereupon rotated to move the locating device 35 upwardly so that the jaw 35b of this locating device engages the journal box 131 from below. Rotation of the worm shaft 125 results in movement of the jaw 151b against the adjacent surface of the journal box 131. Also, the aforementioned third locating device 152 is actuated so that its jaw 152b engages the adjacent surface of the journal box. The journal box 131 is then engaged by three jaws 35b, 151b, 152b while the flange 150d rests on the centering projections 48, 49. As mentioned above, all movements of parts in the illustrated half of the lathe are preferably synchronized with movements of corresponding parts in the other half of the lathe so that both wheels 150b and both journal boxes 131 are engaged and located in the same way.

In the next step, the control system admits pressurized fluid into the upper chamber of the cylinder 30 (or merely allows the fluid to escape from the lower cylinder chamber) so that the housing 5, 5' for the driving roller 11 pivots counterclockwise and the rail section 102 is free to pivot away from the adjacent wheel 150b. When the rail section 102 can bypass the wheel 150b, it is pivoted sideways (about the vertical pin 101 (by the gears 105, 106) so that the weight of the wheel assembly 150 is then carried exclusively by the locating members 35 and centering projections 48, 49. The pinions 112 in both halves of the lathe are thereupon rotated to retract the rail sections 110.

In the next step, the slides 47 are moved downwardly by rotating the hand wheel 55 so that the centering projections 48, 49 are disengaged from the respective flanges 150d. The entire wheel assembly 150 then rests only on the locating devices 35. The control system again admits pressurized fluid into the lower chamber of the cylinder 30 so that the housing 5, 5' pivots clockwise, as viewed in FIG. 5 or 15, and returns the driving roller 11 into engagement with the rim 150c of the adjacent wheel 150b. The pressure of fluid in the lower chamber of the cylinder 30 is selected in such a way that the force with which the driving roller 11 is urged to pivot clockwise plus the force taken up by the jaw 35b equals the weight of the corresponding half of the wheel assembly 150.

In the next step, the cylinder 65 receives pressurized fluid to move the carriage 62 along the ways 60 so that the tool 83 moves into register with the wheel 150b. From there on, the wheel turning operation proceeds in the customary way, i.e., the movements of the tool 83 are controlled by the pattern 97 to insure that the removal of material is terminated when the wheel 150b assumes a predetermined shape.

In order to remove a wheel assembly 150 from the treating station, several of the aforementioned steps are repeated to disengage the driving rollers 11 and the tools 83 from the respective wheels 150b, to move the tools 83 sideways out or register with the respective wheels, to return the rail sections 102, 110, 113 to their operative positions, and to disengage the locating devices 35, 151, 152 from the respective journal boxes 131.

An important advantage of the improved lathe is that it need not comprise several driving rollers for each wheel 150b of a wheel assembly 150 and that the space between each driving roller 11 and the associated tool 83 is substantially unobstructed to allow for unimpeded descent of shavings into the pit 220. This is achieved by mounting the driving rollers 11 at one side and the tools 83 at the other side of the symmetry plane S—S and by employing locating means (FIGS. 1-2 or 3-4) which insure that, once a wheel assembly 150 has been centered by the projections 48, 49 in both halves of the lathe, the wheel assembly remains centered during the entire truing operation. Each of the locating means acts upon the respective end portion of the centered wheel assembly 150 in three different directions, namely, in the axial direction of the axle 150a and in two additional directions at right angles to the axis of the axle 150a and preferably at right angles to each other.

Since the lathe employs only one driving roller 11 for each wheel 150b of a wheel assembly, the rollers 11 can be mounted in compact housings (5, 5') which render it possible to treat a wheel assembly while the latter remains installed in a railroad vehicle, regardless of the diameters of wheels 150b. Also, the distance between the driving rollers 11 and the associated tools 83 can be increased well beyond that between a pair of driving rollers in a conventional lathe. Still further, the improved lathe can employ large-diameter driving rollers each of which can carry the major part of the weight of the corresponding half of a wheel assembly. This can be achieved without necessitating surface hardening or other expensive treatment of driving rollers. The thickness of driving rollers 11 need not exceed that of a wheel 150b.

The carriages 62 and levers 71 are sufficiently remote from the respective housings 5, 5' to allow for unimpeded descent of shavings into the pit 220. Each of the carriages 62 and levers 71 and each of the parts mounted thereon is accessible from several sides for convenient insepction, repair and/or replacement. Also, there is ample room for the use of sturdy levers 71 which can carry means for feeding the tools at a rate to insure rapid removal of requisite quantities of material from the wheels. Still further, there is ample room for mounting of locating means which are strong enough to stand all stresses which develop as a result of removal of material from rotating wheels and/or due to the weight of the wheel assembly.

When a driving roller 11 engages a properly centered and positioned wheel 150b, the line which connects the horizontal pivot axis (member 3) of the housing 5, 5' with the axis of the roller 11 (shaft 8) makes an obtuse angle with the line which connects the axis of the roller 11 with the axis of the axle 150a. Such obtuse angle preferably exceeds 100° (see FIG. 5). The cutting edge of each tool 83 faces the associated driving roller 11 and the latter rotates the wheel 150b in a direction to move successive increments of the flange 150d and rim 150c toward the symmetry plane S—S. Thus, and referring to FIG. 5, the roller 11 rotates the wheel 150b clockwise to thus produce a force one component of which is added to the weight of the wheel assembly and acts vertically downwardly in the symmetry plane S—S. Such force is taken up by the locating devices 35 (FIGS. 1-2) or by the supporting rollers 156 (FIGS. 3-4). The just described positioning of the pivots 3 and shafts 8 relative to the axle 150a insures that the wheel assembly 150 is not disengaged from the locating means even if the driving rollers 11 are biased against the wheels 150b with a substantial force so as to insure that the wheels will rotate while the tools 83 remove relatively thick shavings.

If the rollers 11 consist of soft steel, they are fully stressed only when the tools 83 remove shavings all the way around the circumferences of the wheels 150b. Such mode of operation reduces the wear upon the driving rollers. The driving rollers 11 contribute to the force which urges the wheels against the supporting rollers 156 or the journal boxes 131 against the locating devices 35 without necessitating a pivoting of driving rollers toward the wheels while the tools remove material from the rims 150c or flanges 150d. This is important because the inertia of relatively large driving rollers 11 is sufficient to prevent them from following the outline of a wheel which is of such configuration that the tool 83 cannot remove shavings all the way around its circumference.

The levers 71 for the cross-slides 80 are preferably pivoted to such angular positions that the cutting edges of the tools 83 are located in a plane which includes the common axis of both shafts 70 (in the two halves of the lathe) and the axis of the axle 150a in a properly positioned wheel assembly 150. The angular adjustments of levers 71 are needed to insure such positioning of cutting edges even if a wheel assembly having relatively large wheels 150b is followed by a wheel assembly with smaller wheels, or vice versa. Such positioning of cutting edges guarantees that the tools assume optimum positions for removal of material from the wheels. The cross slides 80 are movable in planes which are parallel to the plane including the axes of the shafts 71 and the axis of an axle 150a in a properly positioned wheel assembly. This prevents a distortion of the wheel profile.

The trucer 85 works, as stated above, in combination with the template 97, controlling the tool 83 through the two cylinders 82 and 65. A description of this kind of control is given, for example, by Darrund Wachter in their book "Hydraulische Antriebe und Druckmittelstenerung", published by Carl Hauser Verlag, Munich, 1952 edition, page 135 to 140.

Without further analysis, the foregoing will so fully reveal the gist of the present invention that others can, by applying current knowledge, readily adapt it for various applications without omitting featuers which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a wheel turning lathe, particularly in a pit-mounted lathe for treating multiple-wear wheels of wheel assemblies forming part of railroad vehicles and having axles carrying pairs of journal boxes and pairs of wheels located between the journal boxes, a combination comprising locating means actuatable to engage a wheel assembly so as to position and maintain the axis of the axle of the wheel assembly in a predetermined vertical plane, said locating means comprising devices arranged to hold the wheels of a wheel assembly against movement in axial direction of the respective axle and in two additional directions at right angles to the axis of the axle; a single driving roller for each wheel of the pair of wheels, each driving roller having an axis located at one side of said predetermined plane and below the axis of the axle of the thus positioned wheel assembly; means mounting each driving roller into driving engagement with the respective wheel and comprising a lever tiltable in a plane normal to said predetermined plane about a horizontal pivot axis and turnably supporting said driving roller, a line connecting said pivot axis with the axis of the driving roller including with a line connecting the axis of the driving roller with the thus positioned axis of the axle of the wheel an obtuse angle; and material removing tools located at the other side of said predetermined plane and movable into material-removing engagement with the wheels of the thus positioned wheel assembly.

2. A combination as defined in claim 1 wherein said obtuse angle is greater than 100°.

3. A combination as defined in claim 1, wherein said locating means comprises supporting rollers arranged to engage the wheels of a wheel assembly from below and two locating devices arranged to engage the journal boxes of the wheel assembly whose wheels are supported by said supporting rollers and acting upon the respective journal boxes at an acute angle to the axis of the respective axle so as to urge the wheels against said driving rollers.

4. A combination as defined in claim 3 for treatment of wheel assemblies wherein each wheel comprises a rim and a flange, said supporting rollers being arranged to engage the flanges of the wheels and said driving rollers being arranged to engage the rims of the wheels in an assembly whose journal boxes are engaged by said locating devices.

5. A combination as defined in claim 3, further comprising means for moving said supporting rollers up and down.

6. A combination as defined in claim 1, further comprising means for centering a wheel assembly prior to actuation of said locating means, said centering means including wheelengaging projections actuatable to move the axis of the axle for the wheels which are engaged by said projections into said predetermined plane and to maintain the axis of the axle in a horizontal position in which the axis of the axle remains during removal of material from the respective wheels.

7. A combination as defined in claim 6, wherein said centering means includes two centering projections for each wheel of a wheel assembly.

8. A combination as defined in claim 6, wherein said locating means comprises three locating devices for each journal box of a wheel assembly and means for moving said locating devices into and from engagement with the respective journal boxes of a wheel assembly.

9. A combination as defined in claim 1, further comprising drive means for rotating said driving rollers in a direction to move successive increments of the wheels which are rotated by said rollers toward said predetermined plane.

10. A combination as defined in claim 1, wherein each of said tools has a cutting edge and further comprising a slide for each of said tools, carrier means pivotably supporting said slides for movement about a horizontal axis parallel to said predetermined plane, and means for pivoting said carrier means about said horizontal axis so as to place said cutting edges into a plane including said horizontal axis and the axis of the axle in the wheel assembly which is positioned by said locating means.

11. A combination as defined in claim 1, wherein said driving rollers and said tools are mounted in a pit and further comprising two sets of rail sections movable to positions in which they extend across said pit to guide and support a wheel assembly during movement into the range of said treating means.

12. A combination as defined in claim 11, wherein each of said sets of rail sections includes a rail section which is pivotable about horizontal and vertical axes.

13. A combination as defined in claim 12, wherein said pivotable rail sections extend across said predetermined plane to support from below the wheels of a wheel assembly which is to be positioned by said locating means, said pivotable rail sections being pivotable by said driving rollers about the respective horizontal axes to thereby lift a wheel assembly whose wheels rest on said pivotable rail sections.

14. A combination as defined in claim 11, wherein each of said sets of rail sections comprises a rail section which is movable lengthwise.

15. A combination as defined in claim 14, further comprising a frame including horizontal supports for said lengthwise movable rail sections.

* * * * *

UNITED STATES PATENT OFFICE
CERTIFICATE OF CORRECTION

Patent No. 3 839 932              Dated  October 8, 1974

Inventor(s)  Theodor Dombrowski

It is certified that error appears in the above-identified patent and that said Letters Patent are hereby corrected as shown below:

(30) Foreign Application Priority Date should read

--January 31, 1972, P 2204328--

Signed and sealed this 27th day of May 1975.

(SEAL)
Attest:

RUTH C. MASON
Attesting Officer

C. MARSHALL DANN
Commissioner of Patents
and Trademarks

UNITED STATES PATENT OFFICE
CERTIFICATE OF CORRECTION

Patent No. 3,839,932     Dated October 8, 1974

Inventor(s) Theodor Dombrowski

It is certified that error appears in the above-identified patent and that said Letters Patent are hereby corrected as shown below:

-- Assignee:   The Wilhelm Hegenscheidt Company (Limited Liability) --.

Signed and Sealed this

Fifth Day of October 1976

[SEAL]

Attest:

RUTH C. MASON
*Attesting Officer*

C. MARSHALL DANN
*Commissioner of Patents and Trademarks*